United States Patent
Suzuki et al.

(10) Patent No.: US 7,214,318 B2
(45) Date of Patent: May 8, 2007

(54) METHOD FOR SEPARATION OF ACTINIDE ELEMENTS

(75) Inventors: Tatsuya Suzuki, Meguro-ku (JP); Yasuhiko Fujii, Meguro-ku (JP); Masaki Ozawa, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 332 days.

(21) Appl. No.: 11/049,651

(22) Filed: Feb. 4, 2005

(65) Prior Publication Data

US 2005/0205494 A1    Sep. 22, 2005

(30) Foreign Application Priority Data

Feb. 17, 2004    (JP) .............................. 2004-039808

(51) Int. Cl.
   *B01D 15/08*    (2006.01)
(52) U.S. Cl. ................... 210/635; 210/656; 210/198.2; 423/6; 423/7; 423/249; 423/250
(58) Field of Classification Search ............... 210/635, 210/656, 659, 198.2; 423/6, 7, 249, 250
   See application file for complete search history.

(56) References Cited

U.S. PATENT DOCUMENTS

| | | | | |
|---|---|---|---|---|
| 4,059,670 A | * | 11/1977 | Kakihana et al. | 423/7 |
| 4,066,507 A | * | 1/1978 | Takagi et al. | 435/71.2 |
| 4,092,398 A | * | 5/1978 | Miyake et al. | 423/7 |
| 4,112,044 A | * | 9/1978 | Miyake et al. | 423/7 |
| 4,199,470 A | * | 4/1980 | Yasuda et al. | 423/6 |
| 4,280,984 A | * | 7/1981 | Miyake et al. | 423/6 |
| 4,318,893 A | * | 3/1982 | Bathellier et al. | 423/10 |
| 4,460,547 A | * | 7/1984 | Sameh et al. | 423/7 |
| 4,475,772 A | * | 10/1984 | Jan | 299/5 |
| 4,699,718 A | * | 10/1987 | Jones et al. | 210/659 |
| 5,476,641 A | * | 12/1995 | Todokoro et al. | 423/6 |
| 5,852,786 A | * | 12/1998 | Bradbury et al. | 588/1 |
| 2002/0130081 A1 | * | 9/2002 | Sato et al. | 210/656 |
| 2003/0146160 A1 | * | 8/2003 | Fugetsu | 210/656 |
| 2003/0176609 A1 | * | 9/2003 | Oishi et al. | 526/317.1 |

FOREIGN PATENT DOCUMENTS

| | | |
|---|---|---|
| JP | 2000-211925 | 8/2000 |
| JP | 2001-305282 | 10/2001 |

OTHER PUBLICATIONS

Machine Translation of Japan Patent No. 2001-305282.*
Machine Translation of Japan Patent No. 2000-211925.*

* cited by examiner

*Primary Examiner*—Ernest G. Therkorn
(74) *Attorney, Agent, or Firm*—Wenderoth, Lind & Ponack, L.L.P.

(57) ABSTRACT

A method for separation of actinide elements comprising feeding a solution containing actinide elements such as americium, curium, californium and the like, into a resin column in which a weakly basic primary, secondary or tertiary anion exchange resin obtained by resinifying pyridine, imidazole or alkylamine has been packed, and then feeding an eluent of a mixed solution of nitric acid and alkyl alcohol such as methanol, ethanol, propanol and the like into the resin column to chromatographically separate the actinide elements from each other. This method makes it possible to efficiently separate the actinide elements from each other by a unit operation at ordinary temperature and ordinary pressure while avoiding oxidation operation, and hence makes it possible to avoid generation of secondary wastes and operations difficult in terms of engineering, such as precipitation.

4 Claims, 2 Drawing Sheets

METHOD FOR SEPARATION OF ACTINIDE ELEMENTS

FIELD OF THE INVENTION

The present invention relates to a method for separating actinide elements such as americium, curium, californium and the like from each other. In more particular, the present invention relates to a method for separation of actinide elements, wherein actinide elements are chromatographically separated from each other utilizing the difference in adsorption characteristics among the actinide elements on a weakly basic anion exchange resin.

BACKGROUND OF THE INVENTION

Actinide elements such as americium (Am), curium (Cm) and transcurium elements (berkelium (Bk), californium (Cf), einsteinium (Es) and the like) are $\alpha$ nuclides contained in spent nuclear fuels in the nuclear power industry. When performing reprocessing or partitioning and transmutation of spent nuclear fuels or treatment/disposal of radioactive wastes, it is needed to separate actinide elements from one another, because their nuclear characteristics, exothermic characteristics and radioactive toxicities are different.

With respect to transcurium elements, Cf-252, for example, finds its way into medical applications such as cancer treatment and an application as neutron source for high-level analysis; and is currently produced via neutron irradiation of plutonium (Pu). However, the production thereof is as little as several grams or less per year. Incidentally, one ton of spent nuclear fuels (burnup 150000 MWD/t, cooled for 4 years) generated from a standard fast breeder reactor contains 3 kg of americium, 0.9 kg of curium, 70 µg of berkelium (mainly Bk-249), 3 mg of californium (isotopic mixture of Cf-249, 250, 251, etc.) and $6 \times 10^{-5}$ ng of einsteinium (mainly Es-254) and all of them migrate into high-level liquid wastes in the course of the reprocessing.

At present, there are developed a variety of separation, recovery and purification techniques; however, it is very difficult to separate trivalent actinide elements which have similar chemical properties, from one another, and there have been established no effective separation, recovery and purification techniques which offer a prospect of bringing into practice at engineering level.

As methods for separation and purification of americium, which is an actinide element, there have been proposed a solvent extraction method, a solid adsorption method and a precipitation method (refer to, for example, Japanese Patent Laid-Open Specification No. 2000-211925 and Japanese Patent Laid-Open Specification No. 2001-305282). However, all these conventional methods require oxidation operation of trivalent americium to pentavalent or hexavalent americium, and moreover, americium in the highly oxidized state is very unstable, and therefore addition of a chemical reagent is indispensable for its oxidation and maintaining it oxidized state. This makes the system and apparatus used for its separation process complicated, and besides, makes it inevitable to generate secondary radioactive wastes.

SUMMARY OF THE INVENTION

The problems associated with these conventional separation methods and intended to solve by the present invention are that these conventional methods require oxidation operation, and make it indispensable to involve a chemical reagent(s) for oxidizing relevant actinide elements and maintaining the oxidized states thereof, thereby making the apparatus and the system complicated, and also making it inevitable to generate secondary radioactive wastes.

The present inventors have found that the use of a combination of a weakly basic anion exchange resin and a solvent of nitric acid-alcohol mixture makes it possible to increase the difference in adsorption characteristics among actinide elements on the resin, and hence nuclide separation among actinide elements comes to be possible. The present invention has been accomplished based on the findings of such phenomenon.

According to the present invention, there is provided a method for separation of actinide elements comprising feeding a solution containing a plurality of actinide elements into a resin column in which a weakly basic anion exchange resin has been packed, and then feeding an eluent of a mixed solution of nitric acid and alkyl alcohol into the resin column to chromatographically separate the actinide elements from each other.

The term "a solution containing a plurality of actinide elements" means any one solution selected from the group consisting of solutions in which spent nuclear fuels are dissolved and high level radioactive liquid wastes. The resin used in the resin column includes weakly basic primary, secondary or tertiary anion exchange resins obtained by resinifying pyridine, imidazole, alkylamine or the like. The alcohol used in the eluent includes alkyl alcohols such as methanol, ethanol, propanol or the like.

In a typical example of the method of the present invention, the solution containing a plurality of actinide elements to be fed into the resin column is a solution containing americium, curium and/or californium, and one or more of the actinide elements (one or more selected from americium, curium or californium) contained in the solution are purified and recovered by chromatographical separation thereof from each other.

As the weakly basic anion exchange resin packed into the resin column, there is used a weakly basic anion exchange resin carried by either a porous silica carrier or a porous carrier made of a substance which undergoes no chemical change in the solution, or a weakly basic anion exchange resin formed as a porous body, thereby obtaining very efficient separation characteristics. The method of the present invention also makes separation operation substantially at ordinary temperature and ordinary pressure possible.

As described above, the invention provides a method using a weakly basic anion exchange resin column and an eluent of a mixed solution of nitric acid and alkyl alcohol, and such a combination enables the chromatographical separation of actinide elements from each other. It enables efficient separation particularly of trivalent actinide elements, such as americium, curium and/or californium from each other. For example, when separating americium from curium and/or californium, americium can be recovered in a high-efficiency and high-purity at engineering level by using a unit operation technique which does not involve oxidation of americium (in other words, change in valence), and hence has decreased secondary wastes generated, and does not involve operations difficult in terms of engineering, such as precipitation (in other words, change in phase).

DETAILED DESCRIPTION OF THE PREFERRED EMBODIMENTS

Figure 1:
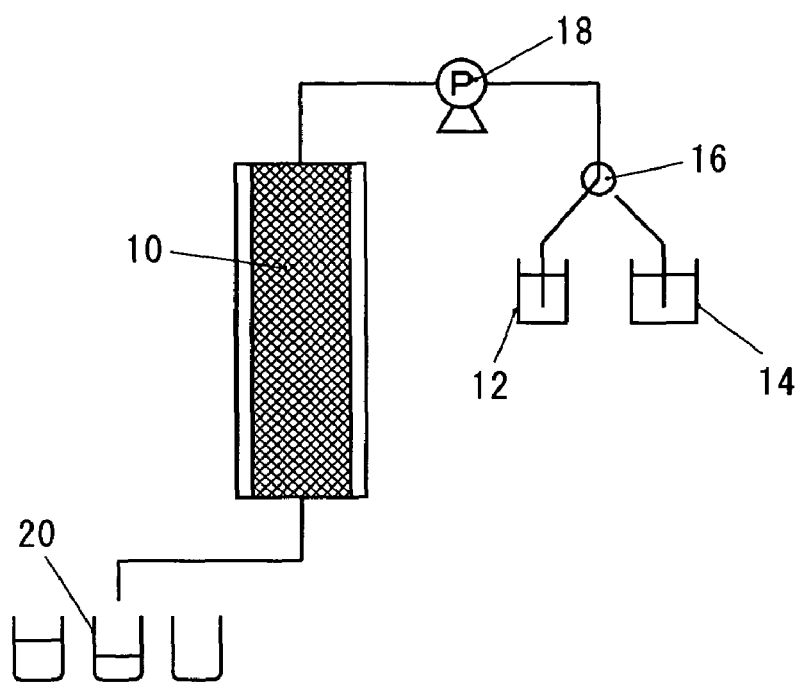
FIG. 1 is a schematic diagram of a separation apparatus used in the present invention.

The separation apparatus used for embodying the method of this invention is schematically shown in FIG. 1. This separation apparatus comprises: a resin column 10 in which a weakly basic anion exchange resin has been packed; a raw material vessel 12 which contains a solution containing a plurality of actinide elements such as americium, curium and the like; an eluent vessel 14 which contains a nitric acid-alcohol mixed solution used for elution; a switching valve 16 which is switched from the solution of actinide elements to the eluent; a pump 18 which feeds the solutions to the top of the resin column 10; and a collection vessel 20 which collects the actinide elements, such as americium, curium and the like, separated from one another by passing the solution through the resin column 10. These components are connected with each other by piping. When the amount of actinide elements, such as americium, curium and the like, is very small, neither the pump for feeding nor the switching valve for switching the solution to the eluent may be sometimes needed.

In the method of this invention, the actinide elements are separated and recovered by: pouring an appropriate amount of solution containing actinide elements on a resin column in which a weakly basic anion exchange resin has been packed; feeding an eluent of a mixed solution of nitric acid and alkyl alcohol on the column; chromatographically separating the nuclides of the actinide elements; and separately collecting the eluted nuclides. The operation is conducted substantially at ordinary temperature. Further, the eluent used is composed only of nitric acid, which is an inorganic acid having a simple structure, and alcohol having only an alkyl group, and thus the purification of separated actinide elements is easily performed. After the separation, the alcohol can be easily disposed of by evaporation or the like, and thus secondary radioactive organic wastes are not generated.

EXAMPLES

Example 1

A resin column having 10 cm long was prepared by packing a resin obtained by resinifying pyridine as a tertiary anion exchange resin. Methanol was used as alkyl alcohol and an eluent was prepared by adding methanol to concentrated nitric acid so that the eluent has a content of 60% by volume methanol. A solution containing americium and curium was poured onto the resin column from its top and then the eluent was fed to the same to chromatographically separate americium and curium from each other. The operation was carried out at ordinary temperature.

Figure 2:
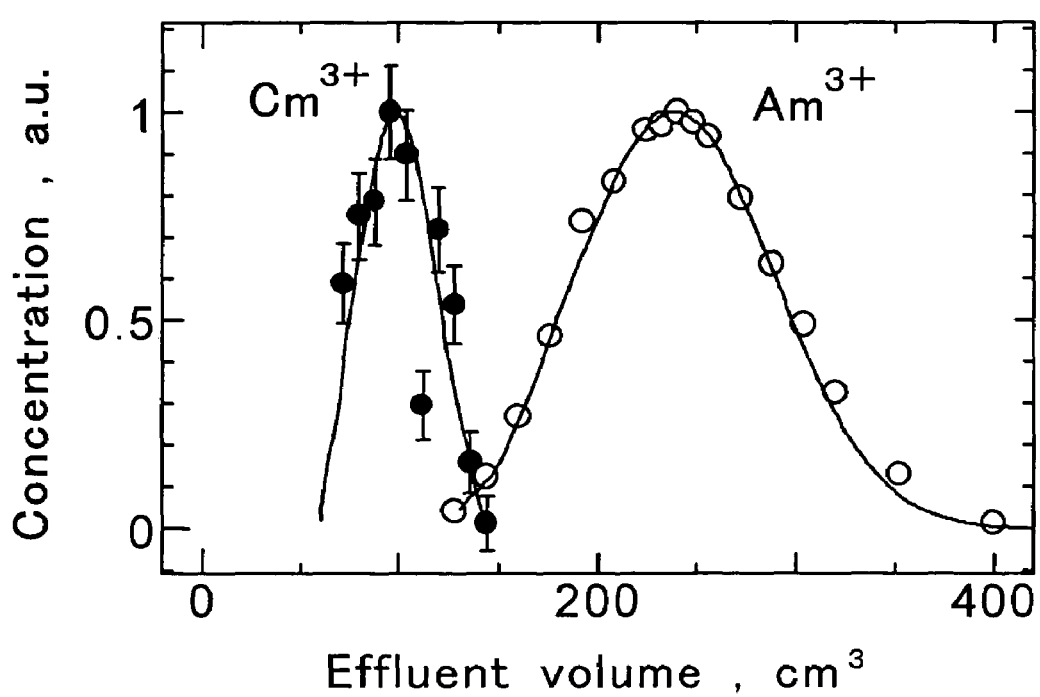
FIG. 2 is a graph showing the separation of americium and curium in Example 1.

The separation results are shown in FIG. 2. FIG. 2 shows that curium can be separated and recovered while the amount of eluate flowing out from the column is small (approximately 140 $cm^3$ or less), whereas americium can be separated and recovered once the amount of eluate becomes large.

Example 2

Similar to Example 1, a resin column having 10 cm long was prepared by packing a resin obtained by resinifying pyridine as a tertiary anion exchange resin. Methanol was used as alkyl alcohol and an eluent was prepared by adding methanol to concentrated nitric acid so that the eluent has a content of 60% by volume methanol. A solution containing americium, curium and californium was poured onto the resin column from its top and then the eluent was fed to the same to chromatographically separate these nuclides from each other. The operation was carried out at ordinary temperature.

Figure 3:
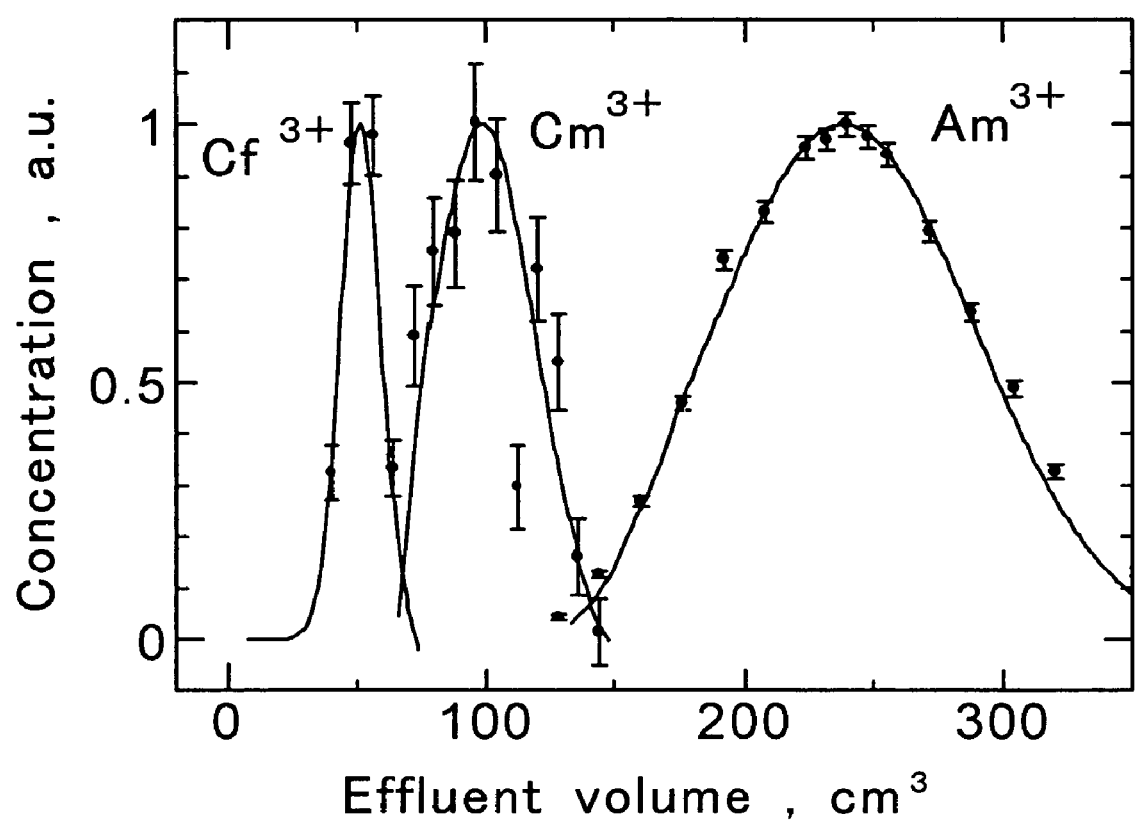
FIG. 3 is a graph showing the separation of americium, curium and californium in Example 2.

The separation results are shown in FIG. 3. FIG. 3 shows that californium can be separated and recovered while the eluate flowing out from the column is very small (approximately 60 $cm^3$ or less), the curium can be separated while the amount of eluate becomes somewhat larger, whereas americium can be separated and recovered once the amount of eluate becomes large.

Actinide recycling currently carried out aims at transmutation of long-life americium and therefore curium is removed from americium. However, according to this invention, not only americium, but also curium and californium can be recovered at high purity. This indicates that the above actinide elements are possibly used for utilizations (e.g. medical and high-level analysis applications) other than transmutation and annihilation. Thus, the present invention is considered to be very significant and advantageous.

The invention claimed is:

1. A method for separation of actinide elements comprising feeding a solution containing a plurality of actinide elements into a resin column in which a weakly basic anion exchange resin has been packed, and then feeding a eluent of a mixed solution of nitric acid and alkyl alcohol into the resin column to chromatographically separate the actinide elements from each other.

2. The method for separation of actinide elements according to claim 1, wherein the solution containing a plurality of actinide elements to be fed into the resin column is a solution containing americium, curium and/or californium, and one or more of the actinide elements contained in the solution are purified and recovered by chromatographical separation thereof from each other.

3. The method for separation of actinide elements according to claim 1, wherein the weakly basic anion exchange resin packed in the resin column is a weakly basic anion exchange resin carried by either a porous silica carrier or a porous carrier made of a substance which undergoes no chemical change in the solution, or a weakly basic anion exchange resin formed as a porous body, and the separating operation is carried out substantially at ordinary temperature and ordinary pressure.

4. The method for separation of actinide elements according to claim 2, wherein the weakly basic anion exchange resin packed in the resin column is a weakly basic anion exchange resin carried by either a porous silica carrier or a porous carrier made of a substance which undergoes no chemical change in the solution, or a weakly basic anion exchange resin formed as a porous body, and the separating operation is carried out substantially at ordinary temperature and ordinary pressure.

* * * * *